(12) United States Patent
Weisberg (10) Patent No.: US 7,861,176 B2
(45) Date of Patent: Dec. 28, 2010

(54) METHODS AND SYSTEMS FOR PROVIDING ONLINE CHAT

(75) Inventor: Jonathan S. Weisberg, Santa Barbara, CA (US)

(73) Assignee: TouchCommerce, Inc., Agoura Hills, CA (US)

( * ) Notice: Subject to any disclaimer, the term of this patent is extended or adjusted under 35 U.S.C. 154(b) by 501 days.

(21) Appl. No.: 11/697,654

(22) Filed: Apr. 6, 2007

(65) Prior Publication Data

US 2007/0245249 A1   Oct. 18, 2007

Related U.S. Application Data

(60) Provisional application No. 60/791,794, filed on Apr. 13, 2006.

(51) Int. Cl.
*G06F 3/00* (2006.01)
*G06F 15/16* (2006.01)

(52) U.S. Cl. .................. 715/758; 715/751; 715/753; 709/204

(58) Field of Classification Search .............. 715/733, 715/738, 751–753, 758, 759, 781, 791; 709/204
See application file for complete search history.

(56) References Cited

U.S. PATENT DOCUMENTS

| | | | |
|---|---|---|---|
| 6,519,628 B1 | 2/2003 | Locascio | |
| 7,124,355 B1 | 10/2006 | Kukkal | |
| 7,263,526 B1 * | 8/2007 | Busey et al. | 707/102 |
| 7,346,671 B2 * | 3/2008 | Hankejh et al. | 709/219 |
| 2002/0049812 A1 * | 4/2002 | Nahon | 709/204 |
| 2002/0146668 A1 * | 10/2002 | Burgin et al. | 434/118 |
| 2004/0233179 A1 * | 11/2004 | Lira | 345/181 |
| 2005/0005247 A1 * | 1/2005 | Kamachi et al. | 715/804 |
| 2005/0198124 A1 * | 9/2005 | McCarthy | 709/203 |
| 2006/0069785 A1 * | 3/2006 | Barrett | 709/229 |

OTHER PUBLICATIONS

Tim Pabst: "A MySQL Driven Chat Script" [Online], Dec. 25, 2001, pp. 1-8, XP002462000; http://www.devarticles.com/index2.php?option=content&task=view&id=31&pop=1&hide_ads=1&page=0&hide_js=1>.

"HTML 4.01 Specification", Internet citation [Online], Dec. 24, 1999, XP002327686; URL:http://www.w3.org/TR/1999/REC-html401-19991224/html40.pdf.gz>.

European Search Report; Application No. EP 07 00 7337, Dec. 27, 2007.

Carroll, J. et al; "Designing our town: MOOsburg", *Int. J. Human-Computer Studies* (2001); Academic Press; pp. 725-751.

"Framed"; Article: http://www.themaninblue.com/writing/perspective/2004/04/22/; 7 pages.

Lucas, Peter; "How co-browsing can ease shoppers anxiety and reduce abandoned shopping carts"; Article: http://www.internetretailer.com/internet/marketing-conference/91849-how-co-browsing-can-ease-shoppers-anxiety-reduce-abandoned-shopping-carts.html; 5 pages, Nov. 27, 2007.

(Continued)

*Primary Examiner*—X. L Bautista
(74) *Attorney, Agent, or Firm*—Knobbe, Martens, Olson & Bear LLP (57) ABSTRACT

The present disclosure relates generally to digital conferencing. A chat server causes a chat user interface to appear as a popup window hovering over a web page. In response to a first event, the chat server causes the chat user interface to appear as part of the web page.

35 Claims, 6 Drawing Sheets

OTHER PUBLICATIONS

"Using customer care without a frameset"; Copyright IBM Corporation 1996, 2005; Article: http://publib.boulder.ibm.com/infocenter/wchelp/v5r6m1/index.jsp?topic=/com.ibm.commerce.customercare.doc/tasks/tlhnoframeset.htm; 3 pages.

Boettcher, S., et al; "Specialized Chat Setups"; Webcrossing; Copyright 1999-2003; Article: http://www.webcrossing.com/webx/Images/Guide/pages/Features/specializedchat.html; 3 pages.

* cited by examiner

METHODS AND SYSTEMS FOR PROVIDING ONLINE CHAT

CROSS-REFERENCE TO RELATED APPLICATIONS

The present application claims priority from U.S. Patent Application No. 60/791,794, filed Apr. 13, 2006, the content of which is incorporated herein in its entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present disclosure relates generally to systems and methods for communicating over computer networks, and in particular, to digital conferencing.

2. Description of the Related Art

Digital conferencing, sometimes referred to as online chat, has become an increasingly useful tool for Web site operators in communicating with users visiting their Web site. However, using many conventional systems, navigation from one web page to another can interfere with the chat user interface.

SUMMARY OF THE INVENTION

Methods and systems are described for online chat. Certain example embodiments enable a chat client user interface to be continuously displayed as a user navigates among different web pages. Certain example embodiments initially display the chat client user interface as a popup or as a simulated popup hovering over a web page, and then, in response to an event, display the chat client user interface as part of the web page. Certain example embodiments of the chat client can be used for different websites offering different services, without requiring extensive customization.

An example embodiment provides a method of providing an online chat session to a user, the method comprising: causing a chat user interface to appear as a popup window hovering over a first web page being accessed by a user; and in response to a first event, causing, at least in part, the chat user interface to appear as part of the first web page.

An example embodiment provides a method of providing an online chat session to a user, the method comprising: causing, at least in part, a chat user interface to be provided to the user via a user browser displaying a first web page, wherein the chat user interface initially appears to obscure at least a portion of first web page content; and causing, at least in part, the chat user interface to be reconfigured in response to a first event, wherein the reconfigured chat user interface does not appear to obscure text and/or graphics associated with the first web page.

An example embodiment provides a system storing instructions that when executed by a computer perform cause the computer system to: provide a first chat user interface to a user via a user browser that displays a first web page, wherein the chat user interface first chat user interface appears to obscure at least a portion of first web page content; and provide a second chat user interface, wherein the second chat user interface does not appear to obscure text and/or graphics associated with the first web page.

BRIEF DESCRIPTION OF THE DRAWINGS

Embodiments of the present invention will be described with reference to the drawings summarized below. These drawings and the associated description are provided to illustrate example embodiments of the invention, and not to limit the scope of the invention.

DETAILED DESCRIPTION OF PREFERRED EMBODIMENTS

Certain example embodiments described herein provide systems and methods for providing persistent and/or continuous chat sessions as a user navigates through the web pages of a Website. In an example embodiment, a chat session can be initiated via a popup chat client or as what appears to be a popup chat client. The popup chat client can then be replaced with a chat client that appears to be part of a web page.

In an example embodiment, the user/customer can trigger a chat on the web page that contains the JavaScript tags. By way of example, the user can trigger the chat session by clicking on a "click-to-chat" control, or by satisfying a condition configured for the web page.

The chat client can open a connection over the Internet with a remote server to enable a chat session to occur. In a further example embodiment, the chat user interface launches into a popup window and then moves into a frameset. By way of example, each frame in a website/web page can display a different document (e.g., an HTML (Hyper Text Markup Language) document). When the content frame is scrolled, associated headers and side bars optionally remain stationary. Optionally, the chat system can be used with a variety of different Web sites without requiring a very significant customization.

Throughout the following description, the term "Web site" or "Web" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. While certain function are described as being implemented using frames, other techniques and technologies can be used such as server-side includes or scripting languages.

In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order.

Similarly, while certain examples may refer to a personal computer system or data device, other computer or electronic systems can be used as well, such as, without limitation, an interactive television, a networked-enabled personal digital assistant (PDA), a networked game console, a networked entertainment device, and so on. While certain references are made to certain example system components or services, other components and services can be used as well. In addition, while certain user inputs are described as being provided via keyboard or mouse inputs, optionally, user inputs can be provided using other techniques, such as by voice or otherwise.

Embodiments of the methods and systems can be used with a variety of different operating systems. Example operating systems include, but are not limited to: Red Hat Linux—Enterprise Edition, Solaris, Windows, Apple OS X, and others.

As similarly discussed elsewhere herein, in an example embodiment, a chat session can be initiated via a popup chat client or as what appears to be a popup chat client. The chat client can open a connection over the Internet with a remote server to enable a chat session to occur. In an example embodiment, a series of interactions between a user chat client and an agent client occur across a connection, such as HTTP or sockets.

By way of example, a chat client user interface can have an area/field in which a user can enter text, and a message area showing the user's, operators/agents (e.g., at an online call center), and system messages. By way of further example, the chat client can include branding associated with the commerce website, such as the name and/or logo of the company. Optionally, a photograph of the operator/agent is displayed as well. The names/identifiers of the chat participants can optionally be displayed as well.

In an example embodiment, a chat client that appears to be a popup can be implemented as an Adobe Flash object. Flash uses vector graphics to reduce file size. A Flash player can be installed on a user computer as a browser plug-in or otherwise. In an example embodiment, a Flash player is configured to permit small tracking files (sometimes referred to as Persistent Identification Elements (PIE) or "Local Shared Object" (".sol") files), to be stored in memory, such as non-volatile memory (e.g., a hard disk drive) of a user's computer. The PIE can store text sent by a server to the Web browser. The PIE can send the tracking file, text data stored therein when the browser accesses that server so that the server can identify the browser and host computer. Optionally, the chat popup can be implemented as an HTML chat client.

The popup client optionally is provided within a frame, such as an inline frame (iFrame) or using an xFrame. An iFrame is an HTML element which makes it possible to embed another HTML document (e.g., accessed using a tag, including a URL (Universal Resource Locator)) inside the main document (e.g., within the HTML of the actual client page). The contents of the frames may be hosted on the same server as the parent/main page, or a frame may link in code from another website server, wherein the remote content is loaded and automatically displayed within the frame. An xFrame is an XML application for combining multiple documents together.

Thus, for example, popup client content may be provided by a first server associated with a customer communication management center entity (referred to herein at times as the "chat system provider"), and the main document may be provided by a second server, such as one that hosts an online commerce website, such as a store, hotel, airline, financial institution, real estate agent, insurance agent/company, or other service provider, or is associated with an education institution, government agency, etc (referred to herein at times as the "website operator").

By way of example, the chat server may be implemented as a socket-based server which controls communication between the chat client used by end customers (e.g., website visitors) and the agent chat client used by agents/operators. Optionally, the chat server utilizes other client server protocols, such as Java Message Service (JMS), IBM Websphere MQ, or other communication/messaging technologies which can be used to send messages between clients.

Optionally, in a pop-up appearing configuration, the size of the iFrame is specified in the surrounding HTML page. Thus, the surrounding page can be presented in the browser prior to the iFrame content (e.g., while the iFrame is being loaded). Optionally, the user can scroll the iFrame out of view. Optionally, the iFrame can have a scroll bar independent of the surrounding page's scroll bar. The embedded HTML document can be replaced with a different document without reloading the surrounding page (e.g., by using the "target" attribute of an HTML anchor or by employing JavaScript) which enables interactive applications. Editing a documents DOM (Document Object Model) tree may be used to provide similar functionality.

Optionally, the chat user interface is configured to appear, optionally using a DIV within the outer document, to hover over the website operator's page, rather than being built around the website operator's site content. Optionally, the chat user interface is into a separate browser popup window.

A chat application is also provided on the agent side. The agent chat client can be different than or the same as the user/visitor chat client. The agent chat client can further list the ongoing chat sessions with users, where the agent can select which visiting user the agent wants to chat with. A chat area is provided via which the agent can chat with a visitor in substantially real-time. A co-browser function is optionally provided which enables the agent to follow a visiting user as the user navigates the website and/or enables the agent to push or guide the visiting user through the website. The agent chat client can be implemented using Flash, Java Swing (a graphical user interface toolbox), .NET, or other technologies.

In an example embodiment, the agent can click on a control (e.g., in the form of a URL link) within the agent chat application user interface that will move the client chat from a popup chat into a continuously visible chat (e.g., in a frame, wherein the chat user interface remains, optionally in the same location, as a visitor navigates the website) that appears to be part of what had been the underlying web page or as part of a different web page. Clicking on the control causes a message (e.g., an XML message), to be transmitted to the visitor's chat client. The message contains information needed to preserve the chat as well as a signal to make it continuously visible as the visitor navigates the website.

In an example embodiment, the chat user interface is made persistently visible by placing it into a frameset so that chat can optionally be continuous from web page to web page. In an example embodiment, the chat popup client makes a call to a script, such a JavaScript, residing within the HTML of the iFrame (layer 3 in FIG. 2) which then opens the URL of a frameset file, optionally hosted by the website operator site. The visitor will then see the web page displayed in the browser change from the website operator's web page with a chat popup into a chat frameset. For example, the chat can live in one frame, such as in the top frame, and the same website operator's web page is living in another frame, such as the lower frame.

Optionally, the chat user interface appears in the top margin of the web page so that if the web page is large enough that it is not all displayed at the same time via the browser, the chat user interface will nonetheless at least initially appear. Optionally, the chat user interface scrolls with the rest of the web page so that if the user scrolls far enough, the chat user interface is not visible. Optionally, instead, the chat user interface floats in place, so that the chat user interface appears persistently in the same location (e.g., the top margin of the web page) even when the user scrolls though the web page. Optionally, the chat user interface is an absolutely positioned chat window. Optionally, the popup chat client and the chat client that appears to be part of a web page have at least partly different associated text and graphics. Optionally, the popup chat client and the chat client that appears to be part of a web page have substantially the same text and graphics.

A continuously visible chat is optionally implemented using techniques other than framesets. For example, an HTML or a Cascading Style Sheets (CSS) margin (e.g., a top margin) can be injected into the website operator's web page pushing the existing content (e.g., down and creating space for a chat window that would be present at the same time the user is seeing the website operator's web page. The injected margin and chat window can be re-drawn on each new page as the user moves across the web site with the context of the conversation being maintained across each web page.

Figure 1:
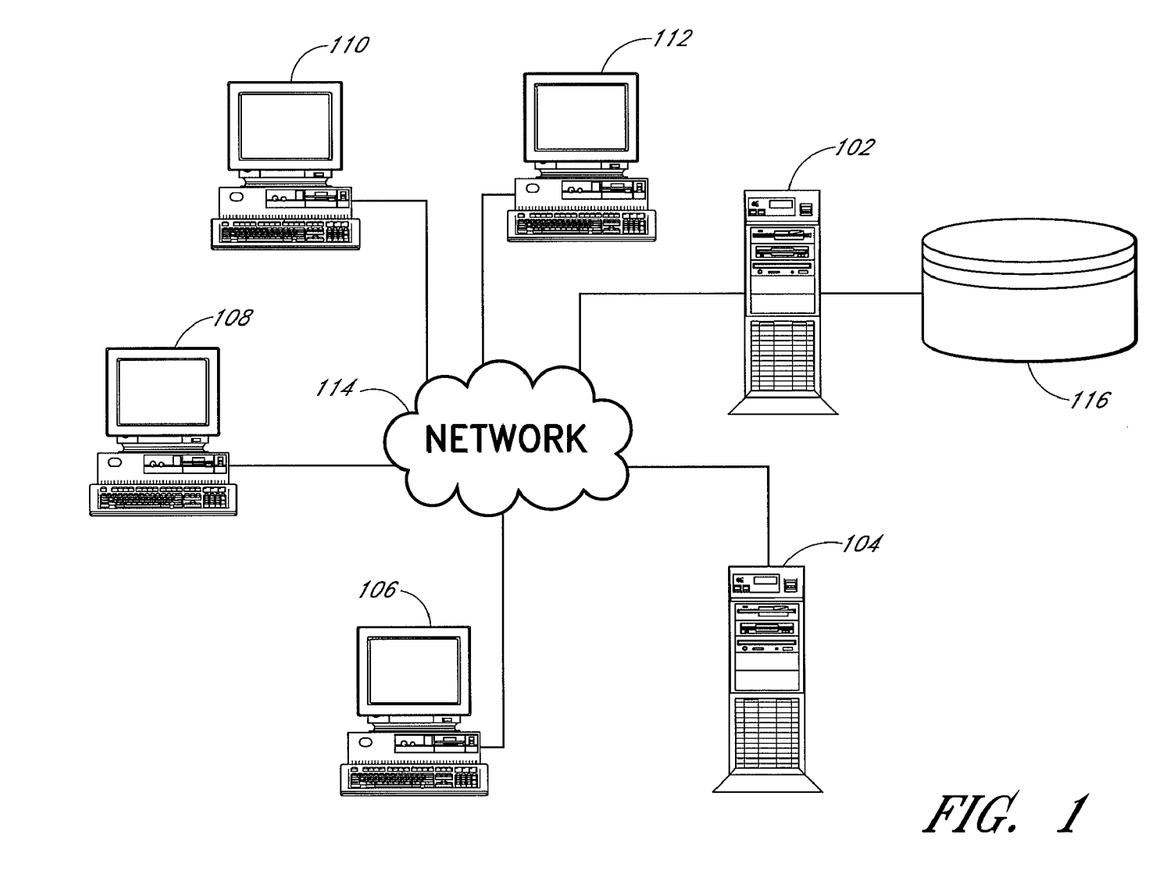
FIG. 1 illustrates a first example networked system in which chat can be utilized.

FIG. 1 illustrates an example networked chat system. A chat system server computer 102 that hosts chats, an ecommerce website server 104, and one or more visitor computer systems 106, 108, one or more agent computer systems, 110, 112, communicate over one or more networks 114, such as the Internet. Optionally, certain computer systems, such as server 104 and agent computer systems 110, 112 are connected via an intranet. The computers 102, 104, 106, 108, 110, 112 can respectively include a processor, volatile memory (e.g., RAM), non-volatile memory (e.g., magnetic disk drives, optical disk drives, FLASH memory, and/or ROM memory), a network interface, one or more displays, and/or printers. The visitor computer systems 106, 108 and/or the agent computer systems 110, 112 can further include browsers to navigate the Internet, websites, and to view web pages. The agent computer systems 110, 112 can include agent chat clients.

Optionally, the chat system server computer 102 is equipped with a database 116 such as MySQL, Oracle Relational Database Management System (RDBMS), Sybase's relational database Adaptive Server Enterprise, Microsoft SQL Server (MSSQL), and/or others for storage and retrieval of certain information, such as HTML code for user interfaces, customization information for chat clients (e.g., size, positioning, and visible content data), account information for website operators utilizing the chat services provided by the chat system server computer 102.

The server computers 102, 104 are configured to function as web servers that accept HTTP requests from clients (e.g., via URLs), such as web browsers, and serve HTTP responses to the clients, optionally in addition to web pages, such as HTML documents, and linked objects, such as images, which can be displayed by the client. The website server 104 can serve appropriate web pages, such as those corresponding to an electronic catalog of products and/or services.

The chat system server computer 102 is programmed to enable visitors to textually converse (e.g., in full duplex mode) with others, such as call center agents. Thus, for example, a voice session, a chat session, or both a voice and chat session can be established between an agent computer and a visitor computer over a TCP/IP packet link via a socket. For example, the agent and visitor can communicate by typing their messages into their respective chat client data entry fields. The chat applications display the messages of each party, with an indication as to whether a message is from the visitor or the agent. If a party wants to terminate the chat session the party can enter a "disconnect" message, activate an "end chat" control, or otherwise terminate the chat.

While in the illustrated example the chat server 102 serves chats for the website hosted by server 104, optionally, the chat server 102 can serve chats for a plurality of websites hosted by a plurality of different servers. Thus, the chat server 102 optionally provides centralized chat management for several websites.

Figures 2, 2A:
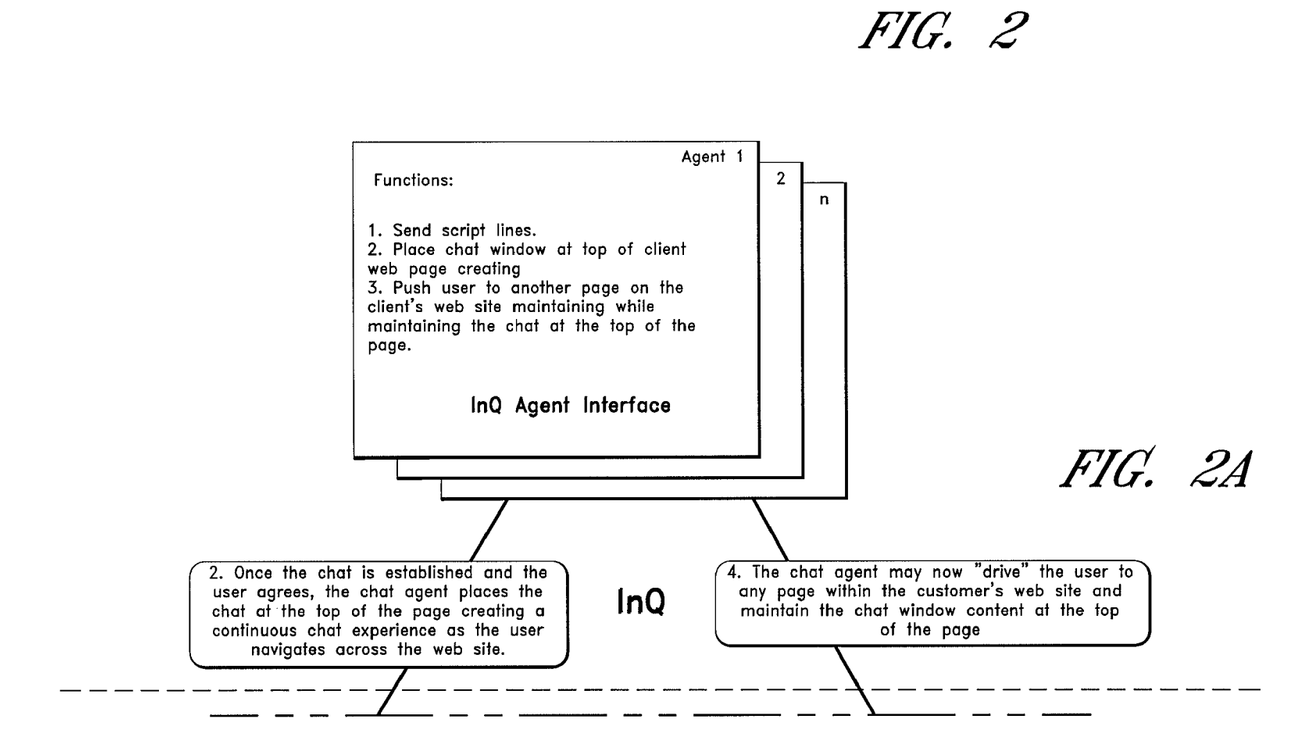
FIG. 2 illustrates an example chat process and elements.
Figure 2B:
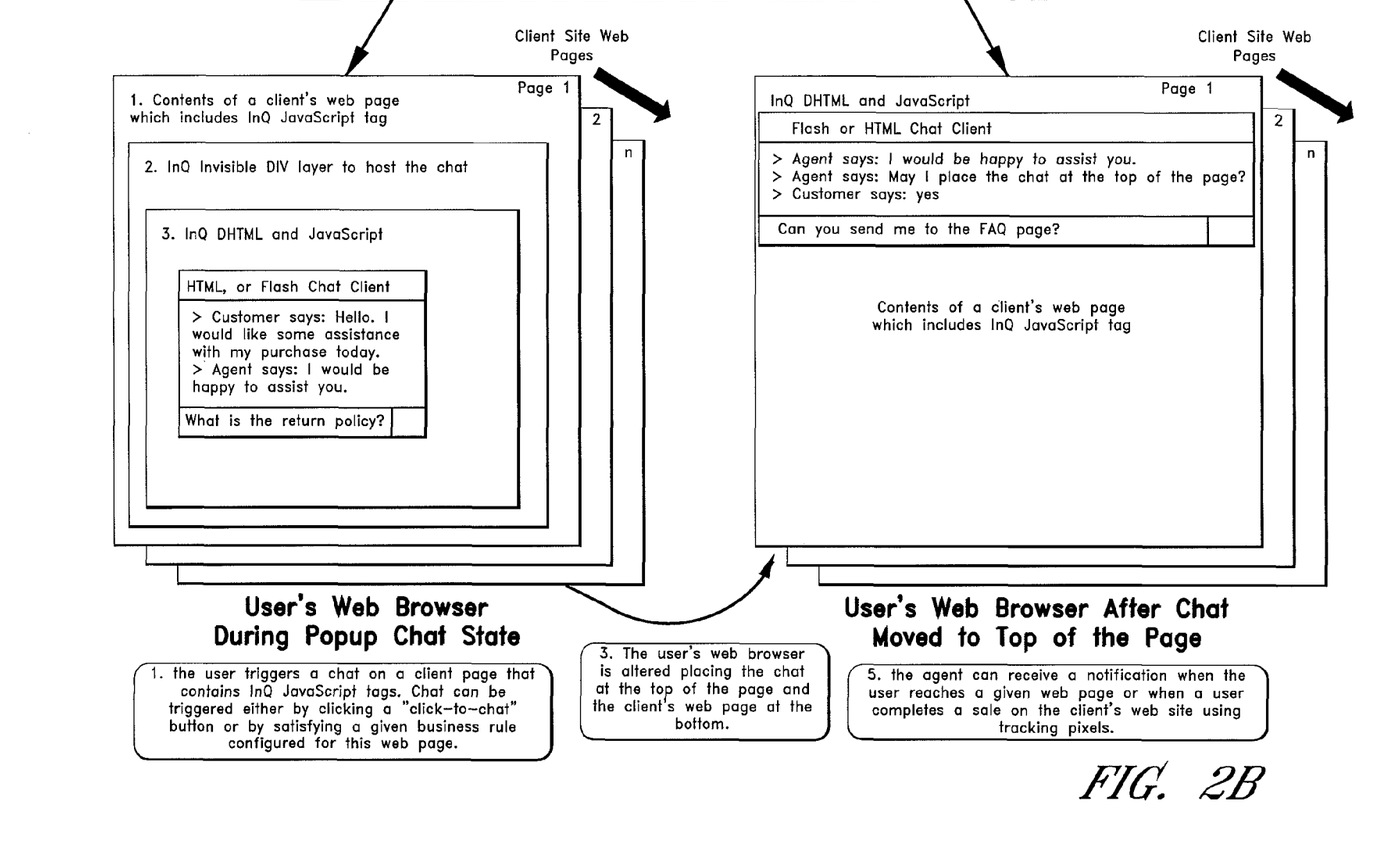

FIG. 2 illustrates an example process and web pages, wherein an agent interface residing on a server, such as server 102, communicates with a user browser hosted by a user terminal, such as terminal 106, to provide for continuous chat as a user navigates a website, such as that hosted by server 104. Thus, the user browser is repopulated with a continuously visible chat user interface.

In this example, the chat client is first displayed as a popup hovering over a web page, and then the top portion of the web page can host a chat client. The bottom portion of the page optionally contains the same content of the website hosted by server 104 that appeared prior to moving to a continuously visible chat. This enables the user to be able to browse through the client's web site without loosing sight of the chat or the context of the conversation.

The chat agent can drive/navigate the user around the website hosted by the server 104. For example, the chat agent is configured to send URLs over the Internet to the chat client which will then be passed (e.g., using XML) over the socket connection to a JavaScript (or other script) method residing within the HTML portion of the top frame. The method will re-populate the lower frame with the new URL. The lower frame of the page then moves to the new URL leaving the chat user interface at the top of the page, operational and in a consistent location. In this manner, chat agent can "drive" the user around the customer's web site and guide them to pertinent information for which the user is looking or which the operator wants them to see. Thus, system can maintain a continuous chat while the user is browsing.

Thus a user's progress can be monitored as the user navigates/is driven about the website so that the server 102 and/or the server 104 knows what page the user is on at a given point, and when the user has reached a certain web page. For example, the agent may direct the user to a page where they can place an order for a product or service. It would be useful for the for the agent to know if the user has in fact completed their order and received a confirmation page stating that their order was successfully submitted. Optionally, tracking pixels can be used to accomplish this functionality.

Tracking pixels (also known as action tags, web beacons, or transparent GIF files) and other similar tracking technologies may be used to collect and store information about user visits (e.g., the user's cookie ID, page visits and duration), and a specific ad or link(s) that the user clicked on to visit the site. Other tracking techniques can be used as well. Tracking pixels are usually small, typically transparent images on a web page that have special names which permit the loading of the web page to be tracked by a web server. The image can be pulled from a server where the chat is hosted (e.g., server 102) and can pass information about pages the user has traveled to back to the chat system.

In an example embodiment, image tags (<IMG> tags) are used to implement tracking pixels which pass information to the chat agents. The <IMG> tag may contain information that uniquely identifies this customer. When the server 102 receives a request for this pixel, the server 102 can trace the request back to the visitor/customer computer (e.g., computer 106) and the agent servicing the chat. Once the server 102 identifies what agent is engaged in or assigned to this chat, the server 102 transmits the agent a message notifying the agent that the customer has reached this page.

The following describes an example implementation of functional areas of the continuously visible chat functionality.

The server 102 can host multiple chat agent clients corresponding to multiple human agents (e.g., call center agents who chat with visitors to one or more websites). By way of example, each multiple chat agent client optionally can handle multiple chat sessions in which the human agent is engaged or has been assigned to. The agent client is responsible for sending script lines, placing the chat user interface at the appropriate location on the web page displayed via the customer browser, and pushing the user browser to a web page on the host website (e.g., ecommerce website).

Initially, upon the occurrence of a certain event (e.g., a visitor accessing a certain web page, a visitor activation of a chat request control, etc.), which is communicated to the chat server, the chat server causes a popup chat user interface, or what appears to a user to be a popup chat user interface (referred to herein as a "simulated popup") to appear on the visitors browser. For example, the popup chat interface can be presented in a window that appears to hover over the web page the visitor had been viewing, rather than in a new browser window.

Referring to FIG. 2, in an example embodiment, layer 2 of the client web site page is implemented as an iFrame on an invisible DIV layer (e.g., with an opacity of 1 or other low number on a scale of 1-100), with an HTML document (e.g., a Dynamic HTML document) with JavaScript residing with the iFrame on layer 3.

The HTML in this example contains the chat client. The chat client can optionally be implemented using Flash or additional HTML code. By way of example, the JavaScript provides the capability to enable/disable, start/stop and make the chat visible or invisible. Layer 3, containing the chat client user interface, is a part of the client's web site, which means the chat itself is a part of the client's web site and not implemented as a browser popup window, even though the chat client user interface appears to hover over the underlying page as a popup window. Therefore, popup blockers will not necessarily detect this as a popup and may not be able to prevent it from appearing.

As discussed above, the chat client user interface can optionally transition from the popup or simulated popup user interface to a user interface that appears to be part of the web page (e.g., that does not appear to visibly block view other portions of the Web page), rather than floating over the web page. Thus, the chat user interface and the client webpage are optionally presented simultaneously, wherein the chat user interface and the client webpage do not obstruct each other. For example, as discussed elsewhere herein, the chat client user interface can be located in a top, bottom, left, or right margin of a web page, in the middle of the web page (e.g., spaced from the top, bottom, left, and right sides), or otherwise positioned. Optionally, portions of the web page into which the chat user interface is being positioned can be shifted (e.g., up, down, left, or right) to accommodate, the chat client user interface.

The transition can be initiated in response to one or more events. For example, a text message can be automatically (or manually) displayed in the chat client user interface asking the visitor if the visitor wants to chat, (e.g., wants help, has questions regarding a product or service, etc.) and/or asking if the visitor agrees to let the chat user interface be placed at a specified portion of the web page. If the visitor indicates that he or she does want to chat the chat server detects this indication (e.g., via a communication sent by the visitor browser over the Internet to the chat server), which then places the chat user interface in a margin or other area of the underlying web page. For example, the visitor can indicate a desire to chat by entering a message into the chat client user interface, such as "yes" in response to the text request discussed above, or by clicking on an "I need help" or "I want to chat" button For example, referring again to FIG. 2 (the right hand illustrated page with the chat client displayed as part of the web page), the outer layer of the page optionally contains the actual HTML frameset. A frameset is specified wherein the chat client can be hosted in one of the frames and the web pages from the website operator (e.g., served by server 104) can be hosted in one or more other frames.

The top frame of the page optionally functions in a similar way to the popup HTML and the popup JavaScript. Optionally, the top frame is implemented as an iFrame. The example top frame contains HTML and JavaScript to host the chat client and to provide additional JavaScript functionality. Such example functionality optionally includes some or all of the following, but is not limited to, the ability to close the chat, the ability to push HTML pages to the lower frame, the ability to produce thank you pages and surveys when the chat is closed, etc.

The frameset chat client illustrated in FIG. 2, wherein the chat client user interface appears to be part of the web page, is optionally implemented as a Flash client implemented as an Adobe/Macromedia Flash (.swf) file, which is configured to provide the look and feel of the chat application. For example, the core socket communication portion of the chat client is optionally implemented by ActionScript code that may be used in concert with JavaScript on the page the chat client resides within. Optionally, HTTP protocol can be used instead to establish the connection.

Optionally instead, when a signal is sent by the server 102 to make the chat continuously visible, the JavaScript inserted from the JavaScript tags creates a margin, such as a top margin above the page content. This effectively slides the page content down a given number of pixels corresponding to the specified margin width. The chat can then be moved into this area so that both the chat and the page content can be viewed simultaneously without overlapping or interfering with each other.

This chat window and top margin is optionally re-inserted on each new page containing the JavaScript tags, thereby creating a persistent chat and maintaining the entire conversation seamlessly across pages. Once the chat conversation has been completed, the top margin is optionally reset and the chat window removed, thereby restoring the original format of the web site.

Figure 3:
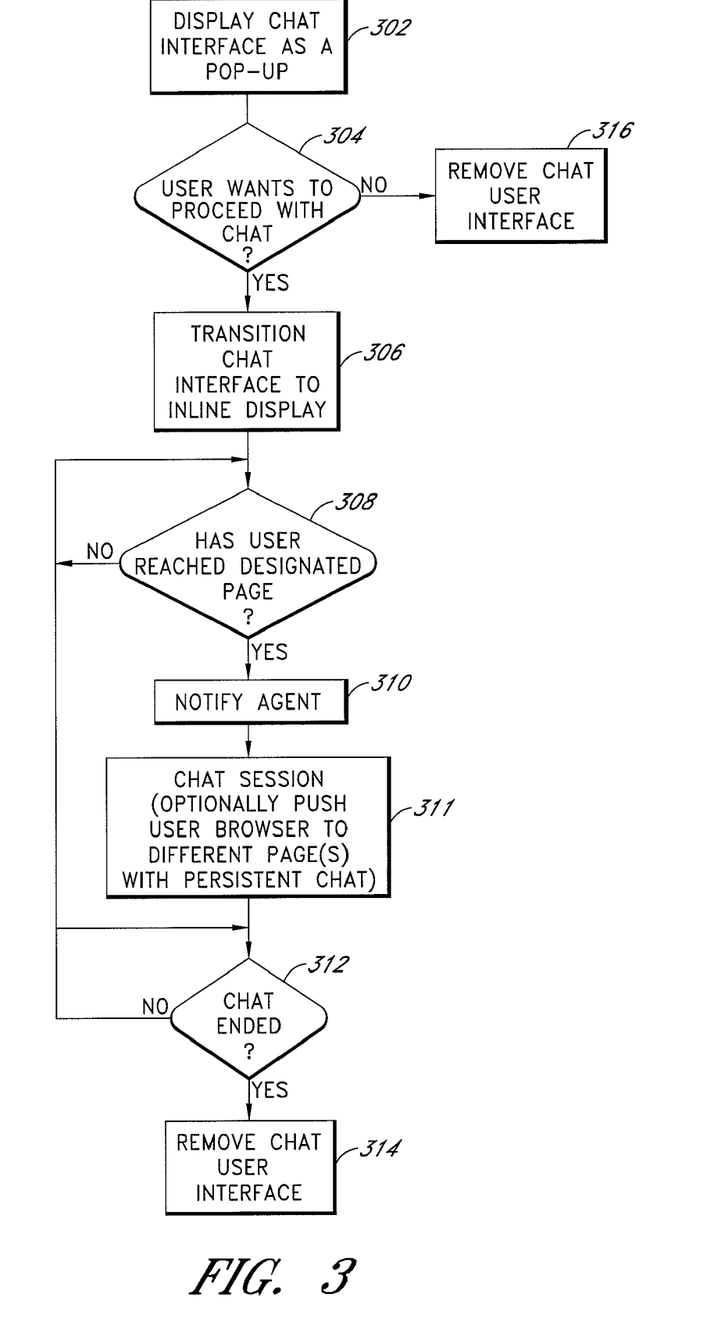
FIG. 3 illustrates an example chat flowchart.

FIG. 3 illustrates an example chat process. In this example, a user is viewing a web page, such as that of an ecommerce site (e.g., an online store) or other site. At state 302, a chat server causes a chat user interface to be displayed as a popup window and provides an initial text message (e.g., "Do you want to chat?"). As similarly discussed above, the chat user interface may be displayed in an actual popup (e.g., in its own window) or as a simulated popup. At state 304, the user provides an indication that the user wants to proceed with the chat (e.g., by replying affirmatively to the initial question, or otherwise). If the user indicates that the user does want to chat, the indication is transmitted via the browser, over the Internet, to the chat server, and the process proceeds to state 306. Otherwise, the process proceeds to state 316, and the chat server causes the chat client user interface to be removed or rendered not visible.

At state 306, the chat server causes the chat client user interface to appear to be part of the web page displayed during state 302, or as part of another web page. For example, as discussed above, optionally an invisible or substantially transparent layer (e.g., a DIV layer with an opacity of 1 or other low number) with an HTML document (e.g., a Dynamic HTML document) with JavaScript residing thereon can be used to provide the appearance of a popup window.

At state 308, the chat server monitors the navigation of the user (e.g., using tracking pixels or a tracking file) to determine if the user browser has navigated to a specified page. If the user has navigated (or was pushed) to the specified page, at state 310 the chat server sends an alert to the agent assigned to the chat session (e.g., assigned by the chat server or otherwise). By way of example, the alert can be in the form of a text message and/or can cause an icon to be displayed on the agent client, and/or can cause the agent client to emit a tone or other audible signal.

At state 311, the chat session between the user and the human agent takes place. Optionally, the human agent pushes the user through the web site during the chat session (e.g., to show the user online catalog pages, to help the user fill out forms, etc.), with the chat client interface persistently displayed, optionally at the same physical location. At state 312, the chat server monitors the chat session to determine if it has ended (e.g., ended by the customer or the agent by closing the chat interface, activating an "end chat" control, or otherwise). If the chat session has ended, at state 314, the chat server removes the chat user interface from the website page being viewed by the customer, and optionally, the other web page content is repositioned so that some of the web page content occupies at least a portion of the area previously occupied by the chat user interface. If the chat session has not ended, the process optionally returns to state 308, or optionally the process continues monitoring at state 312.

Thus, as similarly described above, the technology involved in creating a continuously visible chat technology can be implemented as a system containing a frameset or margin, a chat client, and html and JavaScript that provide the basis for allowing chats to occur undisturbed while providing a feedback loop where agents can push users to various pages on a client site and then receive notification as the user reaches selected locations on the client site. This technology can be deployed with many variations to achieve different executions as desired or needed.

For example, the chat client can exist within any portion of the allotted space provided by a frameset or top margin and can be of any shape or size. The appearance and operation of the chat client can be customized for different websites, as desired by the website operator. In one of the examples provided previously, the chat occurred in the upper frame of the frameset. Optionally, the technology could be implemented with the chat client frame in the bottom frame, or as a center frame, where the website's web page appears in both the upper and lower frame and each of those frames could be "driven" by an agent. Similarly, the top margin approach can be implemented as a bottom, left, or right margin.

This continuously visible chat technology also enables the server 102 and/or the server 104 to alter multimedia objects that the end user is experiencing. For example, if a user asks to view product X, the agent can push a media object to the user that would display product X. That multimedia product can be, by way of example, a graphic file, an animated graphic, a movie clip, a Flash object, a sound clip or other multimedia type that is supported by user's browser, or other browser add-on capability.

Optionally, the continuously visible chat capability includes co-browsing. Co-browsing enables chat agents to see what the users are seeing in their browsers. This is optionally accomplished using tracking pixels that provide the URL of the page the user is browsing. This enables the agent's browser to be pointed to this page. The agent can then optionally be able to receive notifications as the user completes each portion of a form or interacts in different ways with a web site. The agent can then aid users in completing forms, helping them to find specific information or assisting them in using complex client site functionality.

The system design is optionally customizable and reusable in order to enhance the business potential of the solution. Specifically, the chat system described here can be implemented using JavaScript and image tags introduced into the web site where chat will be deployed. This means that this solution does not require software to be installed, customized or managed by the owner of the web site. Instead, once tags are deployed to the site, the chat solution optionally can be enabled/disabled, customized both in functionality and design and optionally managed by a single company from a single portal. For example, the same or substantially program code can be used to generate chat clients for different websites, with customization optionally provided where the website owner can specify where the chat client should be displayed on a webpage (e.g., top, bottom, left, or right margin, or in the middle), and the visual appearance of the chat client user interface (e.g., text, branding, icons, colors, etc.). These customization can be stored in a chat server database with respect to corresponding website accounts, and accessed when generating Thus, certain optional example embodiments provide a reusable chat solution that advantageously not requiring the building and maintenance for each web site customer and allow for centralized chat management across the installed base or a portion thereof.

Figure 4:
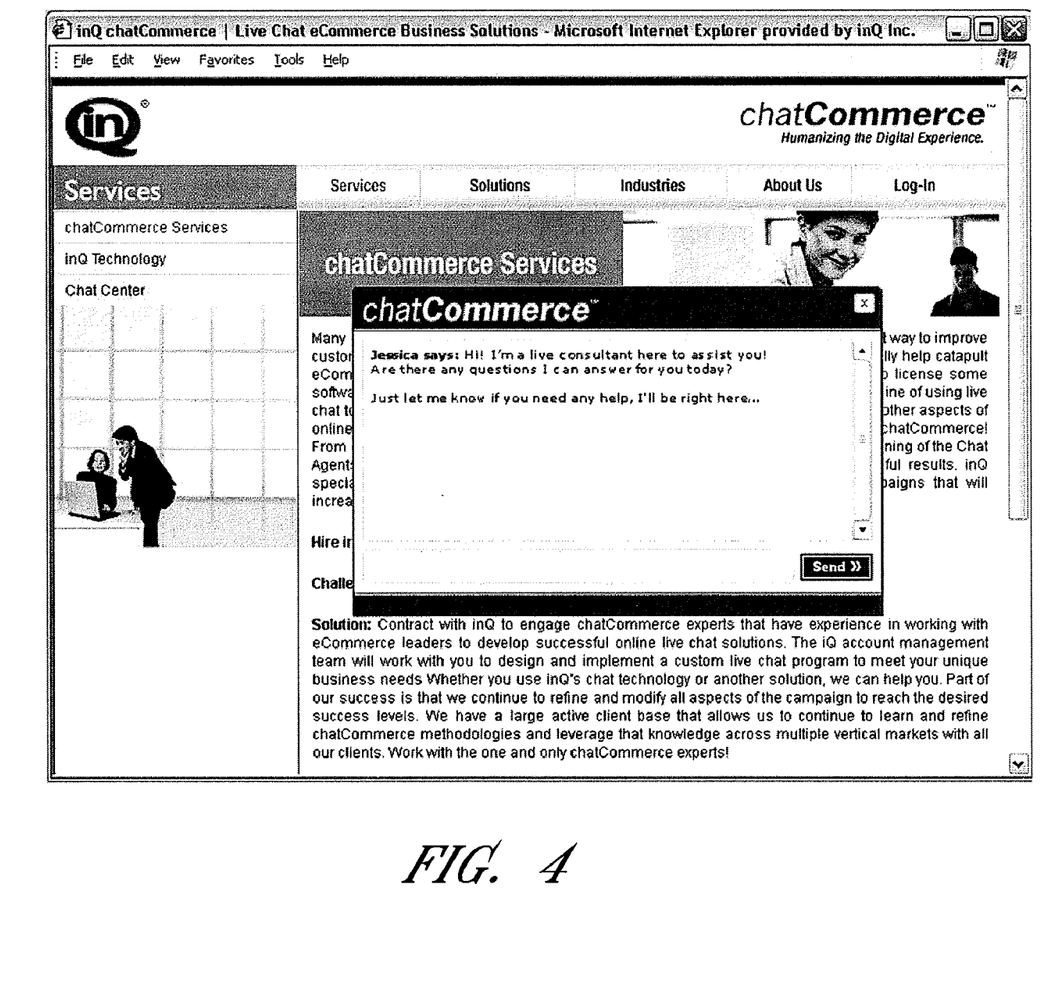
FIG. 4 illustrates an example web page including a chat user interface that appears as a popup.
Figure 5:
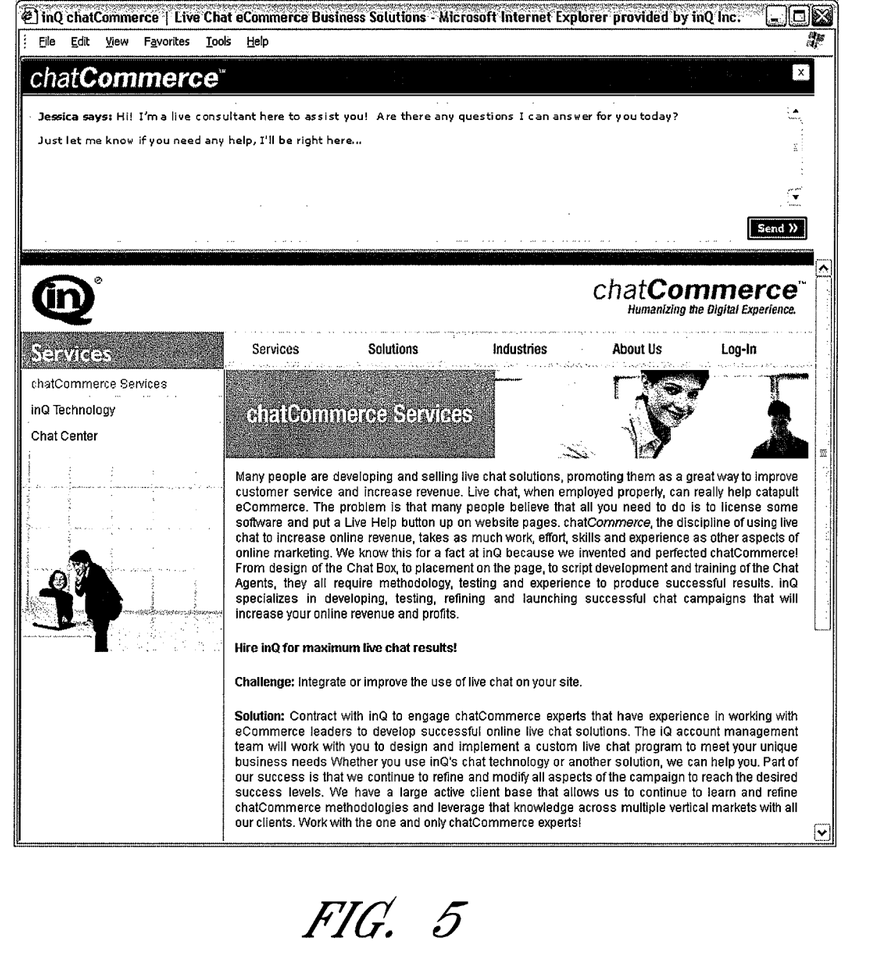
FIG. 5 illustrates an example web page including a chat user interface that appears as part of a webpage.

FIG. 4 illustrates an example web page with a chat client user interface displayed as a popup. FIG. 5 illustrates the example web page with a chat client user interface positioned in a top margin of a web page (e.g., using a frame set).

The example processes and methods described above, using framesets, top margins or other technology to create a continuous chat experience across a web site, optionally provides certain advantages over certain conventional chat technology. The advantages may optionally include some or all of the following:

1. By not using a standard browser popup to host the chat, popup blockers can be avoided.

2. Placing the chat user interface at a page margin (e.g., at the top of the web page) and the client site elsewhere (e.g., below the chat user interface) enables the user to browse through the client's web site while maintaining a chat, and without disrupting the visibility or usability of the content within the client's web pages.

3. The agent has the ability to direct or "drive" users through the client's web site while providing information and assistance as needed.

4. The agent has the ability to know when the user reaches any given page of the client's web site including when the user successfully completes a sale.

5. A reusable chat solution provides the advantage of not having to build and maintain software for each installed customer and allows for centralized chat management across the entire installed base.

Thus, example methods and systems described herein enables agents/operators to chat with potential customers that are browsing on a web site and assist chat agents with converting these potential customers into paying customers. The example continuously visible chat technology described within has been created by integrating several internet technologies such as, by way of example, chat (which could be implemented as Macromedia Flash™, HTML or other technologies), HTML Framesets, HTML or CSS margins, Dynamic HTML, XML, JavaScript and/or Java applications to provide enhanced performance as compared to many conventional chat clients.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method of providing an online chat session to a user, the method comprising:
   using a computing device configured to provide chat user interfaces,
      based at least in part on detecting that the user has accessed a first web page,
         after the user has accessed the first web page,
      causing the chat user interface to appear at a first location of the first web page being accessed by a user via a browser, wherein the chat user interface is smaller than the first web page,
         the chat user interface presenting a message including an inquiry regarding whether the user wants to engage in a chat session with a chat agent;
      where the chat user interface is configured to be persistently displayed in substantially the same location while the first web page is scrolled through; and
   when the user browser navigates from the first web page to a second web page via an action other than the user activating a link presented in the chat user interface, using the computing device to cause, at least in part, the chat user interface to appear at the first location in the second web page so that the chat user interface is positioned at the same location as in the first web page, and
      wherein a chat session is persisted when the browser transitions from the first web page to the second web page.

2. The method as defined in claim 1, wherein the chat user interface is initially displayed as a simulated popup window overlaying the first web page using a substantially transparent web page layer, and is then transitioned to appear as part of the first web page so that the chat user interface does not obscure the first web page.

3. The method as defined in claim 1, wherein the chat user interface is initially displayed as an actual popup browser window overlaying the first web page, and is then transitioned to appear as part of the first web page so that the chat user interface does not obscure the first web page.

4. The method as defined in claim 1, wherein the chat user interface is displayed in a first margin in the first web page as part of the first web page, and is displayed in the first margin in the second web page as part of the second web page.

5. The method as defined in claim 1, wherein contents for the first web page and the second web page are provided by a common source.

6. The method as defined in claim 1, wherein when the chat user interface appears as part of the first web page, it is displayed in a first frame and other data in the first web page is displayed using one or more other frames.

7. The method as defined in claim 1, wherein a chat server provides centralized chat management for a plurality of websites and provides the chat user interface.

8. The method as defined in claim 1, wherein an agent can navigate the user through a plurality of web pages.

9. The method as defined in claim 1, wherein an agent and the user co-browse.

10. The method as defined in claim 1, the method further comprising:
    detecting when the user has navigated to the second web page; and
    providing an alert to an agent.

11. The method as defined in claim 10, the method further comprising using tracking pixels to determine when the user has navigated to the second page.

12. The method as defined in claim 1, wherein a popup blocker fails to block the chat user interface appearing as a popup window.

13. The method as defined in claim 1, wherein a portion of the data displayed on the first web page is hosted on a server different than a server providing the chat user interface.

14. The method as defined in claim 1, wherein an agent causes the chat user interface to transition from appearing as a popup window to appearing as part of the first web page.

15. The method as defined in claim 1, the method further comprising causing at least in part a portion of first web page content to be repositioned so as to accommodate the chat user interface as part of the first web page.

16. The method as defined in claim 1, the method further comprising causing at least in part a portion of first web page content to be repositioned so as to accommodate the chat user interface as part of the first web page, wherein a chat state is preserved when the chat user interface becomes part of the first web page.

17. A method of providing an online chat session to a user, the method comprising:
    using a computing device configured to provide chat user interfaces, causing a chat user interface to appear at a first location of a first web page being accessed by a user via a browser, wherein the chat user interface is smaller than the first web page; and when the user browser navigates from the first web page to a second web page,
using the computing device to cause, at least in part, the chat user interface to appear at the first location in the second web page so that the chat user interface is positioned at the same location as in the first web page, and
wherein a chat session is persisted when the browser transitions from the first web page to the second web page,
wherein the chat user interface is initially displayed as a popup window overlaying the first web page and is then transitioned to appear as part of the first web page so that the chat user interface does not obscure the first web page, and wherein when the chat user interface that appears as part of the first web page, the chat user interface has at least partly different text and/or graphics as compared to when the chat user interface appears as a popup window.

18. The method as defined in claim 1, wherein the chat user interface is displayed in the first web page and the second web page via a DIV layer.

19. A system that provides an online chat session to a user, the system comprising:
a computing device;
non-transitory, computer readable memory that stores instructions, that when executed by the computing device, configured to perform operations comprising:
using a computing device configured to provide chat user interfaces,
based at least in part on detecting that the user has accessed a first web page,
after the user has accessed the first web page,
causing the chat user interface to appear at a first location of the a first web page being accessed by a user via a browser, wherein the chat user interface is smaller than the first web page,
the chat user interface presenting a message including an inquiry regarding whether the user wants to engage in a chat session with a chat agent;
where the chat user interface is configured to be persistently displayed in substantially the same location while the first web page is scrolled through; and
when the user browser navigates from the first web page to a second web page via an action other than the user activating a link presented in the chat user interface,
using the computing device to cause, at least in part, the chat user interface to appear at the first location in the second web page so that the chat user interface is positioned at the same location as in the first web page, and
wherein a chat session is persisted when the browser transitions from the first web page to the second web page.

20. The system as defined in claim 19, wherein the chat user interface is initially displayed as a simulated popup window overlaying the first web page using a substantially transparent web page layer, and is then transitioned to appear as part of the first web page so that the chat user interface does not obscure the first web page.

21. The system as defined in claim 19, wherein the chat user interface is initially displayed as an actual popup browser window overlaying the first web page, and is then transitioned to appear as part of the first web page so that the chat user interface does not obscure the first web page.

22. The system as defined in claim 19, wherein the chat user interface is displayed in a first margin in the first web page as part of the first web page, and is displayed in the first margin in the second web page as part of the second web page.

23. The system as defined in claim 19, wherein contents for the first web page and the second web page are provided by a common source.

24. The system as defined in claim 19, wherein when the chat user interface appears as part of the first web page, it is displayed in a first frame and other data in the first web page is displayed using one or more other frames.

25. The system as defined in claim 19, wherein a chat server provides centralized chat management for a plurality of websites and provides the chat user interface.

26. The system as defined in claim 19, wherein an agent can navigate the user through a plurality of web pages.

27. The system as defined in claim 19, wherein an agent and the user co-browse.

28. The system as defined in claim 19, the operations further comprising:
detecting when the user has navigated to the second web page; and
providing an alert to an agent.

29. The operations as defined in claim 28, the operations further comprising using tracking pixels to determine when the user has navigated to the second page.

30. The system as defined in claim 19, wherein a popup blocker fails to block the chat user interface appearing as a popup window.

31. The system as defined in claim 19, wherein a portion of the data displayed on the first web page is hosted on a server different than a server providing the chat user interface.

32. The system as defined in claim 19, wherein an agent causes the chat user interface to transition from appearing as a popup window to appearing as part of the first web page.

33. The system as defined in claim 19, the operations further comprising causing at least in part a portion of first web page content to be repositioned so as to accommodate the chat user interface as part of the first web page.

34. The system as defined in claim 19, the operations further comprising causing at least in part a portion of first web page content to be repositioned so as to accommodate the chat user interface as part of the first web page, wherein a chat state is preserved when the chat user interface becomes part of the first web page.

35. A system that provides an online chat session to a user, the system comprising:
a computing device;
non-transitory, computer readable memory that stores instructions, that when executed by the computing device, configured to perform operations comprising:
using a computing device configured to provide chat user interfaces,
based at least in part on detecting that the user has accessed a first web page,
after the user has accessed the first web page,
causing the chat user interface to appear at a first location of the a first web page being accessed by a user via a browser, wherein the chat user interface is smaller than the first web page,
the chat user interface presenting a message including an inquiry regarding whether the user wants to engage in a chat session with a chat agent;
where the chat user interface is configured to be persistently displayed in substantially the same location while the first web page is scrolled through; and when the user browser navigates from the first web page to a second web page via an action other than the user activating a link presented in the chat user interface, using the computing device to cause, at least in part, the chat user interface to appear at the first location in the second web page so that the chat user interface is positioned at the same location as in the first web page, and wherein a chat session is persisted when the browser transitions from the first web page to the second web page wherein the chat user interface is initially displayed as a popup window overlaying the first web page and is then transitioned to appear as part of the first web page so that the chat user interface does not obscure the first web page, and wherein when the chat user interface that appears as part of the first web page, the chat user interface has at least partly different text and/or graphics as compared to when the chat user interface appears as a popup window.

* * * * *

UNITED STATES PATENT AND TRADEMARK OFFICE
CERTIFICATE OF CORRECTION

| | | |
|---|---|---|
| PATENT NO. | : 7,861,176 B2 | Page 1 of 1 |
| APPLICATION NO. | : 11/697654 | |
| DATED | : December 28, 2010 | |
| INVENTOR(S) | : Jonathan S. Weisberg | |

It is certified that error appears in the above-identified patent and that said Letters Patent is hereby corrected as shown below:

Column 8, line 31, Change "button" to --button.--.

Column 10, line 55, Change "generating" to --generating.--.

Column 13, line 36, In Claim 19, after "the" delete --a--.

Column 14, line 58, In Claim 35, after "the" delete --a--.

Signed and Sealed this
Twenty-first Day of June, 2011

David J. Kappos
*Director of the United States Patent and Trademark Office*